Figure 1:
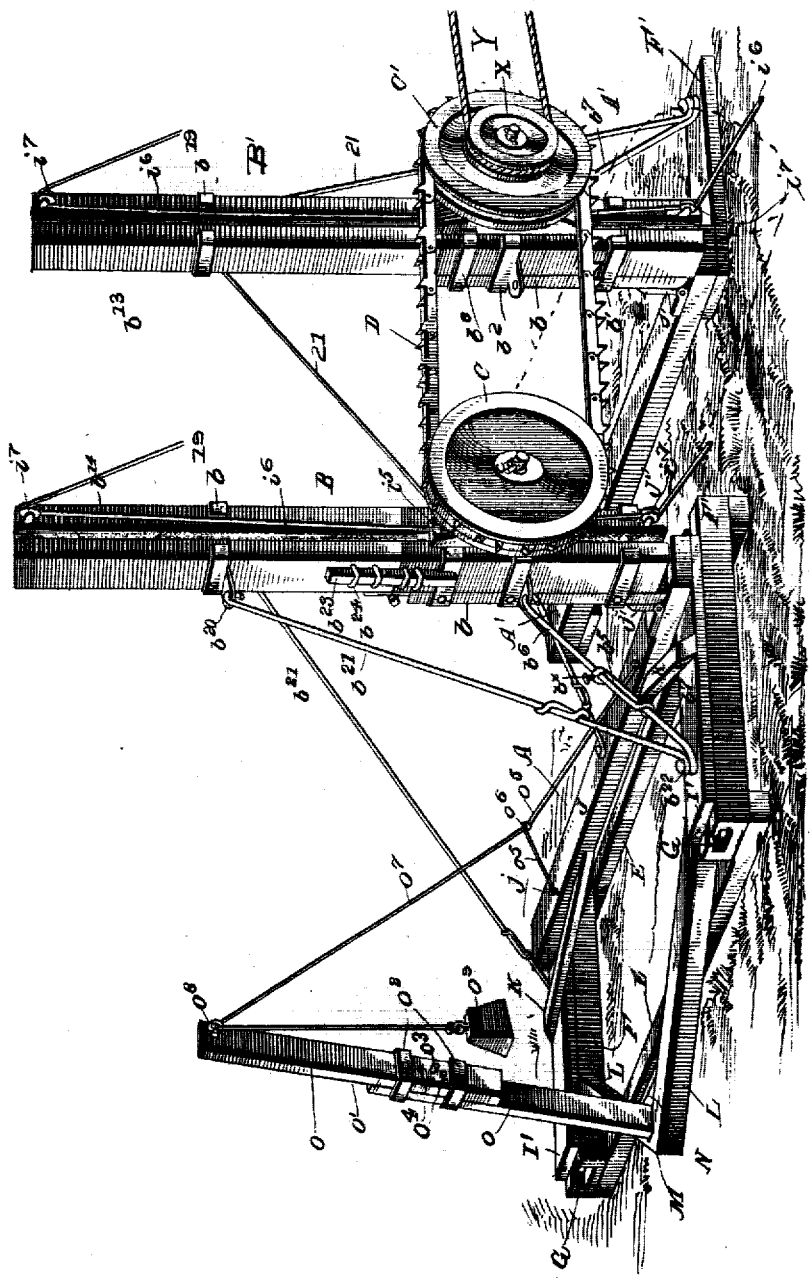

No. 824,009. PATENTED JUNE 19, 1906.
S. J. GRAY & J. HORNING.
SAWING MACHINE.
APPLICATION FILED APR. 29, 1905.

3 SHEETS—SHEET 1.

WITNESSES:
C. C. Duffey
C. E. Trainor

INVENTORS
SIMON J. GRAY
JOHN HORNING
BY Munn & Co.
ATTORNEYS

No. 824,009. PATENTED JUNE 19, 1906.
S. J. GRAY & J. HORNING.
SAWING MACHINE.
APPLICATION FILED APR. 29, 1905.
3 SHEETS—SHEET 2.
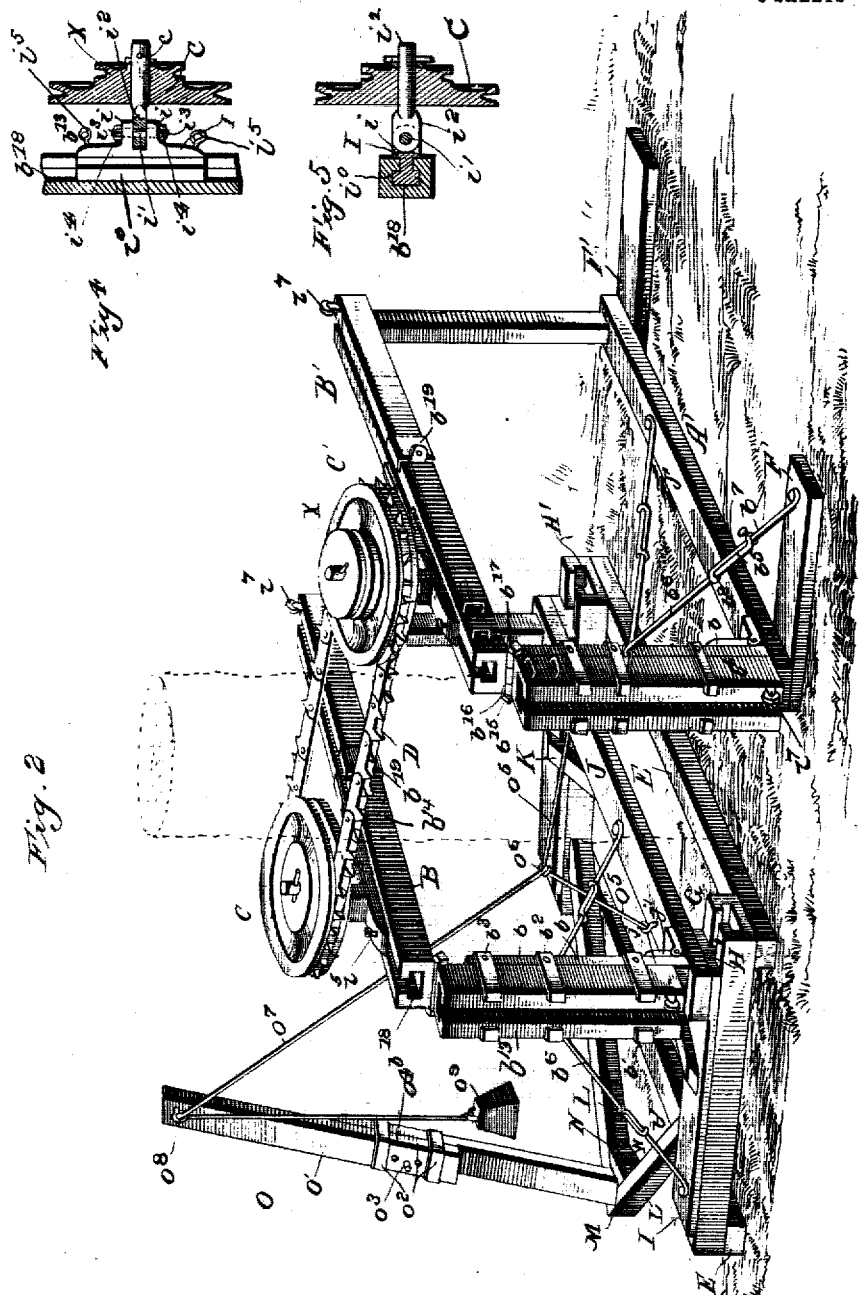
WITNESSES:
C. C. Duffy
C. E. Trainor
INVENTORS
SIMON J. GRAY
JOHN HORNING
BY Munn & Co
ATTORNEYS

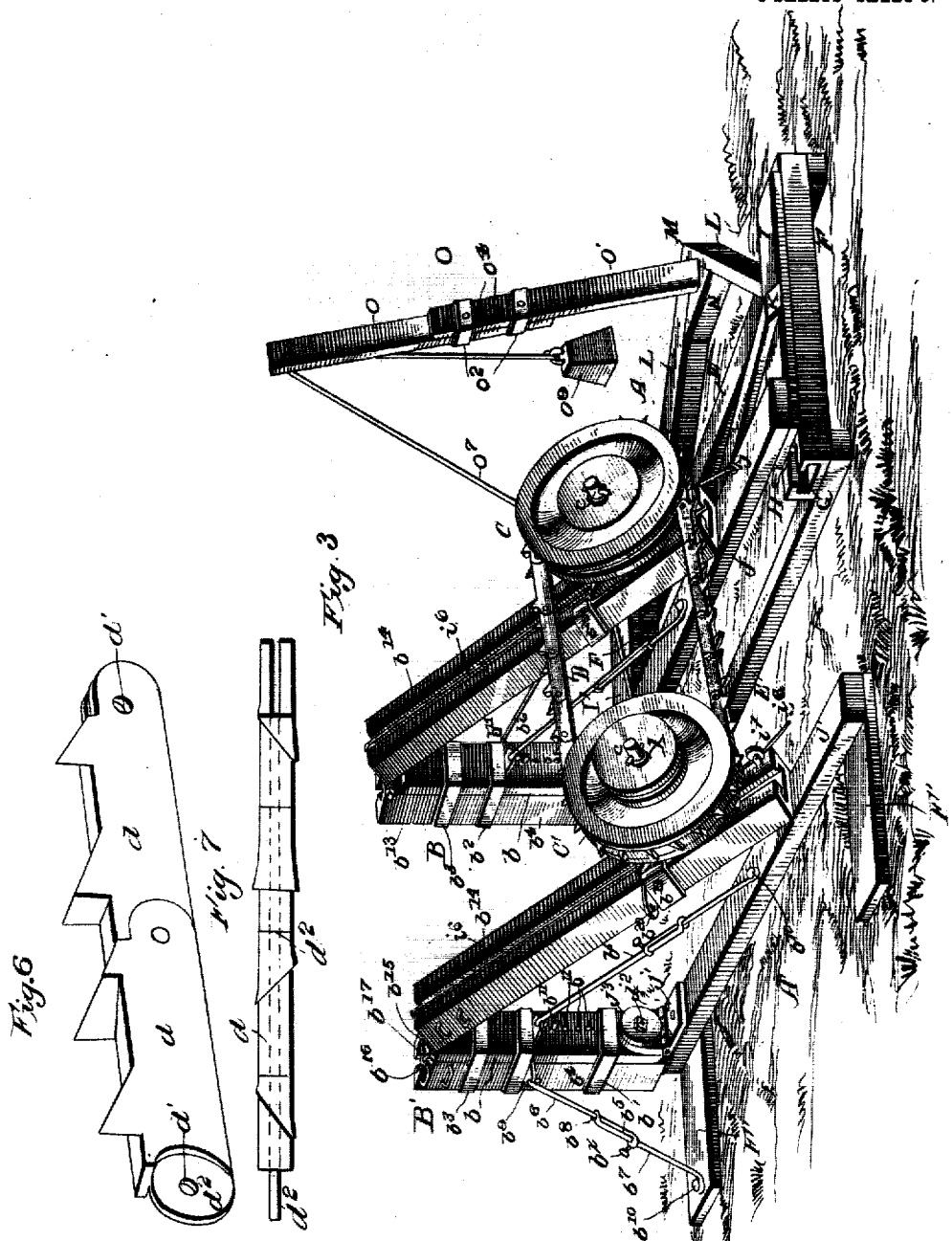

UNITED STATES PATENT OFFICE.

SIMON JOHNSTONE GRAY AND JOHN HORNING, OF OAKLAND, CALIFORNIA.

SAWING-MACHINE.

No. 824,009.  Specification of Letters Patent.  Patented June 19, 1906.

Application filed April 29, 1905. Serial No. 258,102.

*To all whom it may concern:*

Be it known that we, SIMON JOHNSTONE GRAY and JOHN HORNING, citizens of the United States, residing at Oakland, in the county of Alameda and State of California, have invented a new and useful Improvement in Sawing-Machines, of which the following is a specification.

The object of the invention is to provide a novel machine of the endless-saw type adapted for cutting in any position—either vertically, horizontally, or at any desired angle.

A further object is to provide means for cutting at any height desired, whereby trees may be cut near or far from the ground and large or small logs sawed with equal facility.

The invention consists in the above and certain other novel features of construction and in combination of parts, more fully and particularly described hereinafter and pointed out in the claims.

Referring to the accompanying drawings, Figure 1 is a perspective view of my invention, showing it in position for sawing a log. Fig. 2 is a perspective view of the device as arranged for sawing down a tree with a square horizontal cut. Fig. 3 is a perspective view of the same in position for making an oblique upward cut. Fig. 4 is a detail of the slide-block and pulley. Fig. 5 is a transverse vertical section thereof. Fig. 6 is a perspective view of a portion of the saw, and Fig. 7 is a plan view of the same.

Our invention comprises in the present embodiment bed-plates A and A', supporting standards B and B' for carrying the pulleys C and C', around which travels the endless saw D. The bed-plate A comprises sills E, connected at either end by cross-bars F F', provided with undercut grooves G, in which move correspondingly-shaped tongues H' of slide-bars I'. A longitudinal bar J connects the inner ends of the slide-bars I', and braces K are provided to secure the proper degree of rigidity between the slide-bars and longitudinal bar. Braces L extend obliquely from the outer ends of the cross-bars F to a meeting-point M, and a cross-piece N at a suitable distance from the meeting-point forms a triangular opening in which is stepped an extensible bar O, comprising two sections $o$ and $o'$, held in sliding contact with each other by sleeves $o^2$. A pin $o^3$ engages a series of holes $o^4$ in the sections, thus retaining the bar in the desired state of extension. Guy-ropes $o^5$, attached to eye-bolts $j$ at a suitable distance on either side of the center of the bar J, extend diagonally inward to a ring $o^6$, attached to the end of a rope $o^7$, passing through an eyebolt $o^8$, attached to the end of the extensible bar O and having connected to its free end a suitable weight $o^9$. A hinge $j'$ on the front end of the longitudinal bar J, having one of its leaves provided with a ratchet-face, carries the standard-support $b$, having a rounded lower end and provided with a washer $j^0$, having a ratchet-face to coact with the ratchet-face of the leaf and connected to said leaf by a bolt $j^2$ and nut $j^3$.

The inclination of the standard-support may be varied by loosening the nut, thus allowing the coacting ratchet-faces to slip by each other until the desired degree of inclination is attained, after which the nut is tightened, thus retaining the support in the desired position.

Collars $b'$, $b^2$, and $b^3$, attached to the standard-support $b$, retain in sliding contact therewith the standard B, and extensible braces $b^5$, comprising sections $b^6$ and $b^7$, sliding upon each other through eyes $b^8$ on the engaging ends of the section and secured in the adjusted position by thumb-screws $b^x$, extend from ears $b^9$ on the central collar $b^2$ to bolts $b^{10}$ on the longitudinal bar J and the slide-bar I'. A pin $b^{11}$, engaging holes $b^{12}$ in the standard and standard-support, serves to retain the standard at the desired elevation.

The standard B, in sliding contact with the support $b$ and embraced by the collars $b'$, $b^2$, and $b^3$, comprises two sections $b^{13}$ and $b^{14}$, connected by a friction-hinge $b^{15}$, having a pivot-pin $b^{16}$ with a screw-threaded end, upon which is a nut $b^{17}$ for the purpose of increasing the friction between the leaves of the hinge when desired.

An undercut groove $b^{18}$ in the rear face of the standard B receives a correspondingly-shaped tongue $i^0$ of a slide I, Fig. 5, provided on its free face with bearings $i$ to receive a cross-pin $i'$, having rigid therewith a stud-shaft $i^2$, on which is journaled a grooved pulley C, retained on the shaft by a pin $c$. The ends $i^3$ of the cross-pin $i'$ are screw-threaded, and nuts $i^4$ engage with the screw-threaded ends for the purpose of fixing the stud-shaft to the bearings. Eyebolts $i^5$, secured to the slides I, are engaged by ropes $i^6$, passing over pulleys $i^7$, on the upper and lower ends, respectively, of the standard for the purpose of raising and lowering the slides and retaining them at the proper elevation.

A collar $b^{19}$, slidingly mounted in the upper section $b^{14}$ of the standard B and provided with ears $b^{20}$, gives attachment for extensible braces $b^{21}$, similar to the braces $b^5$, and connected at their lower ends to bolts $b^{22}$ on the slide-bar I' and the bar J', respectively. A bar 23, engaging staples $b^{24}$, on the upper and lower section of the standard B, serves to retain the sections in alinement.

The bed-plate A' comprises sills F' and a longitudinal connecting-bar J', provided with a hinge for securing the standard B' thereto. The standard B' is a duplicate of the standard B and carries a pulley C', similar to the pulley C, but having secured to its free face a power-wheel $x$, deriving motion from a source of power (not shown) through an endless rope Y.

Extending over the pulleys C C' and in the grooves thereof is an endless saw D, composed of links $d$, wedge-shaped in cross-section and having teeth on the wider edge. A hole $d'$ pierces each end of the link, and the ends are shaped on the arc of a circle having the hole as its center. One end of the link is formed into a tongue $d^2$ and in the other end is a groove to receive the tongue of the succeeding link, and a rivet secures the sections together. The tongue $d^2$ is flattened and reduced within the circumference of the circle on which the ends are shaped to accurately receive the lips of the grooves, thus forming a rule-joint.

To cut down and afterward saw up a tree, we place the bed-plates on either side of the tree and turn the upper sections of the standards upon their hinges until the saw is at the proper angle, retaining the sections in position by props under their free ends. The slides are moved to their proper positions, the pulleys are lined up and locked to the slides, and power is imparted to the saw. When the tree is felled, the bed-plates are placed on each side of the trunk, the section of the standards are alined and fixed, and the same procedure is repeated with the slides and pulleys. The saw receives its feed in the first instance through the moving of the slides toward the tree and in the second by the weight of the slides and saw.

It will be evident that by constructing our apparatus in two detached portions we secure many important advantages, among which may be mentioned ease of transportation, adjustability to topographical conditions, and cheapness of construction. An efficient tensioning of the saw is also obtained by this feature, and as a consequence a gain in efficiency with no increase in power. The provision of a link-saw is an important part of our invention, since by its use the utilization of all the advantages of our detached construction is made possible, the highest degree of flexibility between the detached portion being thus obtained.

The provision of the hinge $j'$ permits the inward inclination of the standard-supports with respect to the bed-plates.

The saw forms no part of the present application, the same forming a part of our copending application, filed July 20, 1905, Serial No. 270,529.

The sliding frame, comprising the slide-bars I' and the bar J, together with the flexible cord $o^7$ and the weight $o^9$, forms an efficient tensioning means for the saw, and the tension may be varied by increasing or decreasing the size of the weight.

Having thus described our invention, what we claim as new, and desire to secure by Letters Patent, is—

1. In a machine of the class described, a frame comprising two detached portions each provided with a bed-plate, a frame slidably mounted upon one of the bed-plates and movable toward and from the opposite frame portion, means for yieldingly restraining the movement of the sliding frame in one direction, a standard-support adjustably mounted upon the sliding frame, means for locking the support in any desired adjustment with relation to the sliding frame, extensible braces connecting the support and sliding frame, a second standard-support hinged upon the bed-plate of the other detached portion, extensible braces connecting the support and bed-plate, grooved standards comprising upper and lower sections and slidably mounted upon their respective supports, means for locking the standards to their supports, friction-hinges connecting the upper and lower sections of the standards, means for tensioning the hinges, extensible braces connecting the upper sections of the standards to the sliding frames and the bed-plates respectively, slides having tongues operating in the grooves of the standards, means for moving the slides, bearings on the slides, cross-pins journaled in the bearings, means for locking the cross-pins to the bearings, stud-shafts rigid with the cross-pins, grooved pulleys journaled on the stud-shafts, an endless saw running in the grooves and connecting the detached portions of the frame, and means for actuating the pulleys.

2. In a machine of the class described, a frame comprising two detached portions, each provided with a bed-plate, a frame slidably mounted upon one of the bed-plates and movable toward and from the opposite frame portion, a standard-support pivotally mounted on the sliding frame, means for locking the support in any desired adjustment relative to the sliding frame, a second standard-support mounted upon the bed-plate of the other detached portion, standards comprising upper and lower sections slidably mounted upon their respective supports and having undercut grooves, friction-hinges connecting the standard-sections, extensible braces connecting the upper sections to the bed-plates respectively, slides having tongues coacting with the grooves in the standards, means for moving the slides, bearings on the slides, cross-pins journaled in the bearings, stud-shafts rigid with the cross-pins, pulleys journaled on the stud-shafts and provided with peripheral grooves, an endless saw running in the grooves and connecting the detached portions, and means on one of the frames for adjusting one of the pulleys whereby to tension the saw.

3. In a machine of the class described, a frame comprising two detached portions each provided with a bed-plate, a frame slidably mounted on one of the bed-plates, standards pivotally mounted on the sliding frame, means for varying the inclination of the standards, a second standard mounted on the other bed-plate, slides movably mounted on the standards, stud-shafts journaled on the slides, means for locking the stud-shafts to the slides, pulleys journaled on the stud-shafts, an endless saw running on the pulleys, means for actuating the pulleys and means on one of the detached portions for adjusting one of the pulleys whereby to tension the saw.

4. In a sawing-machine, a frame comprising two detached portions each provided with a bed-plate, standards mounted on the bed-plates, means for varying the inclination of the standards to the bed-plate, slides movably mounted on the standards, means for moving the slides, pulleys journaled on the slides, means for varying the inclination of the pulleys to the slides, an endless saw running over the pulleys and connecting the detached portions of the frame, and means on one of the bed-plates for adjusting one of the pulleys whereby to tension the saw.

5. In a sawing-machine, a frame comprising two detached portions each provided with a bed-plate, standards movably mounted on the bed-plates, means for locking the standards in any desired adjustment to the bed-plates, slides movably mounted on the standards, pulleys journaled on the slides, means for varying the inclination of the pulleys to the slides, an endless saw running on the pulleys and connecting the detached portions of the frame, and means for actuating the pulleys.

6. A sawing-machine comprising two detached portions each provided with a bed-plate, standards comprising hinged sections movably mounted on the bed-plates, slides movably mounted on the standards, stud-shafts journaled in the slides, means for locking the stud-shafts to the slides, pulleys journaled on the stud-shafts, an endless saw running on the pulleys and means for adjusting one of the pulleys whereby to tension the saw.

7. A sawing-machine comprising two detached portions each provided with a bed-plate, standards comprising hinged sections mounted on the bed-plates, means for varying the inclination of the standards to the bed-plates, slides movably mounted on the standards, stud-shafts journaled on the slides, pulleys on the stud-shafts, an endless saw on the pulleys, and means for adjusting one of the pulleys whereby to tension the saw.

8. A sawing-machine comprising two separate and independent portions, each provided with a bed-plate, standards mounted on the bed-plates, slides movably mounted on the standards, stud-shafts pivoted to the slides, means for fixing the stud-shafts with respect to the slides, pulleys journaled in the stud-shafts, an endless saw on the pulleys and connecting said detached portions, and means adjusting one of the pulleys whereby to tension the saw.

9. A sawing-machine, comprising two separate and independent portions, each provided with a bed-plate, standards mounted on the bed-plate, pulleys journaled in the standards, an endless saw running on the pulleys, and a counterbalance acting on one of said pulleys for tensioning the saw.

10. A sawing-machine comprising two separate and independent portions each provided with a bed-plate, standards mounted on the bed-plates, pulleys journaled on the standards, an endless saw running on the pulleys, and means for adjusting one of the pulleys whereby to tension the saw.

11. A sawing-machine comprising two separate and independent portions, pulleys mounted on each of said portions, an endless saw running on the pulleys, and means for adjusting one of the pulleys whereby to tension the saw.

12. A sawing-machine comprising two separate and independent portions, means on the detached portions for supporting and carrying an endless saw, and means for adjusting one of said supporting means whereby to tension the saw.

13. In a machine of the character described, a frame comprising two separate and independent portions, a flexible endless saw connecting said detached portions, and means for actuating the saw.

14. In a machine of the character described, a frame comprising two detached portions for supporting an endless saw, means on one of the detached portions for tensioning the saw comprising a bed-plate, a frame slidably mounted thereon and movable toward and from the opposite portion, an extensible brace stepped in the bed-plate, and a counterpoised connection between the sliding frame and the extensible brace.

15. A sawing-machine comprising two detached portions for supporting an endless saw, means on one of the detached portions for tensioning the saw comprising a bed-plate, a frame slidably mounted on the bed-plate and movable toward and from the opposite detached portion, an adjustable brace removably secured to the bed-plate, means for locking the brace in the desired adjustment, and a counterpoised connection between the sliding frame and the adjustable brace.

16. In a sawing-machine a frame comprising two detached portions, a standard mounted upon each of the detached portions, extensible braces connecting the standards to the respective portions of the frame and comprising each a plurality of sections, eyes on the engaging ends of the sections for engaging the adjacent section, means for locking the sections in the desired position of adjustment, and an endless saw supported by the standards.

17. In a sawing-machine a frame comprising two detached portions, slides movably mounted on the detached portions, bearings on the slides, cross-pins journaled in the bearings, and means for locking the cross-pins to the bearings, stud-shafts rigid with the cross-pins, and an endless saw supported by the stud-shafts.

18. In a machine of the character described, a frame comprising two detached portions, a saw-supporting standard mounted upon each of the detached portions, comprising a plurality of sections, friction-hinges connecting the sections, means for tensioning the hinge, and an endless saw supported on the stud-shafts.

SIMON JOHNSTONE GRAY.
JOHN HORNING.

Witnesses:
FRANK HERALD,
ANDREW J. FULMER.